United States Patent

[11] 3,607,936

| [72] | Inventor | Franz Merger<br>Ludurgshafen, Germany |
|---|---|---|
| [21] | Appl. No. | 787,625 |
| [22] | Filed | Dec. 27, 1968 |
| [45] | Patented | Sept. 21, 1971 |
| [73] | Assignee | Badische Anilin- & Soda- Fabrik<br>Aktiengesellschaft<br>Ludwigshafen am Rhein, Germany |
| [32] | Priority | Dec. 29, 1967 |
| [33] | | Germany |
| [31] | | P 16 43 726.6 |

[54] PRODUCTION OF NITRILOTRISPROPIONIC UREIDE
1 Claim, No Drawings

[52] U.S. Cl............................................................ 260/553 E,
260/615.5, 260/DIG. 20, 260/94.9 GD, 260/93.5 A, 260/87.7
[51] Int. Cl........................................................ C07c 27/00

[50] Field of Search........................................... 260/553 E

[56] References Cited
UNITED STATES PATENTS

| 2,580,832 | 1/1952 | Pietrusza.................... | 260/561 |
|---|---|---|---|
| 2,663,733 | 12/1953 | Subluskey................... | 260/561 |

OTHER REFERENCES
Merger, Chem. Ber. Vol. 101, 2419– 2425 (1968)

Primary Examiner—Bernard Helfin
Assistant Examiner—Michael W. Glynn
Attorney—Marzall, Johnston, Cook and Root ABSTRACT: Production of nitrilotrispropionic ureide by reaction of acrylic ureide with ammonia, and the new nitrilotrispropionic ureide itself which is a stabilizer for polyformaldehyde and a valuable starting material for the production of textile auxiliaries, synthetic resins and antistatic agents in the textile and plastics fields.

PRODUCTION OF NITRILOTRISPROPIONIC UREIDE

The invention relates to the production of nitrilotrispropionic ureide by reaction of acrylic ureide with ammonia, and to the new substance itself.

It is known that acrylamide (U.S. Pat. No. 2,663,733) or methyl acrylate (U.S. Pat No. 2,580,832) can be reacted with ammonia to form nitrilotrisproprionamide. The preparation of nitrilotrispropionic ureide has not hitherto been described.

The object of this invention is a new process for the production of nitrilotrispropionic ureide in a simple way, in good yields and high purity.

Another object of the invention is the new nitrilotrispropionic ureide.

These and other objects are achieved and nitrilotrispropionic ureide is obtained advantageously by reacting acrylic ureide with ammonia.

The reaction may be reproduced by the following equation:

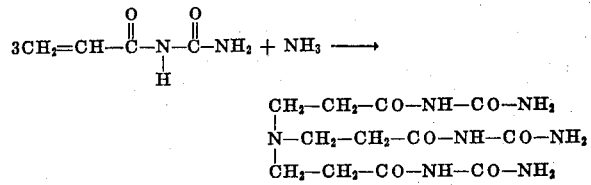

The process according to this invention yields nitrilotrispropionic ureide in a simple way in good yields and high purity. It is surprising that side reactions, as for example the formation of α- and β-aminopropionic ureides, aminated propionamides, acrylamide, iminodipropionic ureide, iminodipropionamide, nitrilotrispropionamide, nitrilotrispropionic mono(di)-ureidodi (mono)amide, hexahydropyrimidinedione-(2,4), play no important role. When using an aqueous medium it is surprising that adding on of water to the C=C double bond of the acrylic ureide with the formation of the corresponding hydroxy compounds and ureide or amidocarbonyl ethyl ethers does not take place to any appreciable extent.

The acrylic ureide used as starting materials may be prepared for example by reaction of urea and acrylic chloride. If desired, the reaction mixture obtained according to the said process may be reacted direct (without isolation of the acrylic ureide) with ammonia by the process according to the present invention to form the nitrilotrispropionic ureide.

The other starting material is ammonia, preferably in aqueous solution and in a molar ratio of 3:1 to 1:3 with reference to acrylic acid ureide. The reaction is carried out generally at a temperature of from 0° to 100° C., preferably from 20° to 80° C., at atmospheric or superatmospheric pressure, continuously or batchwise. Water and/or organic solvents which are inert under the reaction conditions such as cyclic ethers, for example dioxane, tetrahydrofuran; esters, for example ethyl acetate; or nitriles, for example acetonitrile, are generally present. It is preferred to use from 5 to 40 percent by weight aqueous solutions of acrylic ureide and a 25 to 30 percent by weight aqueous ammonia solution.

The reaction may be carried out as follows: ammonia, preferably in aqueous solution, is added at the reaction temperature to acrylic ureide, preferably in aqueous solution. The mixture is left for from one to five hours at the reaction temperature. The end product which crystallizes out is filtered off, washed with water and if necessary recrystallized from a suitable solvent, for example water or dimethylformamide. nitrilotrispropionic ureide is sparingly soluble in many organic solvents, and is readily soluble in dimenthyl sulfoxide, acetic acid and in many aqueous acids and bases.

The new compound which can be prepared by the process is a stabilizer for polyformaldehyde and a valuable starting material for the production of textile assistants, synthetic resins and antistatic agents in the textile and plastics fields. Thus for example it may be reacted with 11 or 12 moles of ethylene oxide and the resultant oxyethylation compound may (direct or after quarternization with dimethyl sulfate) be incorporated in an amount of from about 0.5 to 2 percent by weight into plastics, for example polyethylene, polyvinyl chloride or polystryene, which is thereby given an antistatic finish.

The invention is illustrated by the following examples. The parts specified in the examples are by weight.

EXAMPLE 1

228 parts of acrylic ureide is dissolved in 1,000 parts of water at 80° C., the solution then being cooled to 50° C. 50 parts of 30 percent aqueous ammonia solution is added in the course of 30 minutes and the mixture is allowed to stand for two hours. The colorless crystalline precipitate is filtered off and washed with water. 218 parts of nitrilotrispropionic ureide is obtained having a melting point of 223° to 225° C. This is equivalent to 91 percent of the theory. Analysis:

| | | | | |
|---|---|---|---|---|
| calculated: | C 40.11% | H 5.89% | O 26.7% | N 27.29% |
| found: | C 39.9% | H 6.1% | O 26.9% | N 27.2% |

EXAMPLE 2

40 parts of a 30 percent aqueous ammonia solution is added at room temperature to 1,000 parts of a 12 percent solution of acrylic ureide in dioxane obtained by reaction of the adduct of urea and acryloyl chloride (1:1) with triethylamine at 70° C. Five hours later the deposited crystalline product is filtered off and washed with water. 95 parts of nitrilotrispropionic ureide having a melting point of from 219° to 222° C. is obtained (equivalent to 83 percent of the theory).

I claim:
1. Nitrilotrispropionic ureide.